United States Patent [19]
Tanaka

[11] 3,867,030
[45] Feb. 18, 1975

[54] FILM CONTROL SYSTEM BY PICTURE FRAME EDGE SIGNALS OF A FILM

[76] Inventor: Atsuyuki Tanaka, 2-1-Sonenishi-machi, Toyonaka-shi, Osaka-fu, Japan

[22] Filed: Mar. 19, 1973

[21] Appl. No.: 342,493

Related U.S. Application Data

[63] Continuation-in-part of Ser. No. 44,730, June 9, 1970, Pat. No. 3,721,495.

[52] U.S. Cl. ............................................... 355/41
[51] Int. Cl. ........................................ G03b 27/46
[58] Field of Search ......... 355/41, 97, 109, 108, 14, 355/29, 48, 49, 50, 51

[56] References Cited
UNITED STATES PATENTS

| | | | |
|---|---|---|---|
| 2,209,342 | 7/1940 | Loughridge et al. | 355/41 |
| 2,580,270 | 12/1951 | Badgley et al. | 355/41 X |
| 2,594,358 | 4/1952 | Shaw | 355/41 |

*Primary Examiner*—Samuel S. Matthews
*Assistant Examiner*—E. M. O'Connor
*Attorney, Agent, or Firm*—Watson, Cole, Grindle & Watson

[57] ABSTRACT

In a film control system in which, while a film with a number of picture frames disposed in alignment thereon is being transferred in the direction of picture frame disposition, a detecting means detects the density change on the film to generate signals. A first discriminating means distinguishes from these detected signals, the picture frame edge signals for recording the detected signals on the recording tape. When, according to the recorded signals, the picture frame is positioned exactly at the exposure station disposed on the film path, the first discriminating means causes the stopper to be actuated, thereby stopping the transfer of the film. There are also provided a recording roller rotating in association with transfer of the film; a recording head for recording signals from the detecting means into the recording roller through a gate; four reading heads each arranged at a predetermined position with respect to the recording head; and a second discriminating means whose output causes operation of the stopper for bringing the film to an emergency stop, when the outputs of the recording heads actuate the gate and the second discriminator does not detect a true picture frame edge signal.

4 Claims, 9 Drawing Figures

FILM CONTROL SYSTEM BY PICTURE FRAME EDGE SIGNALS OF A FILM

This application is a Continuation-in-Part of Ser. No. 44,730, filed June 9, 1970, and now U.S. Pat. No. 3,721,495, issued Mar. 20, 1973.

BACKGROUND OF THE INVENTION

This invention relates to a film control system in which a number of picture frames are disposed in alignment on the film and when the picture frame of film is positioned exactly at the exposure station in the course of transfer of the film in the direction of picture frame disposition, transfer of the film is stopped. More particularly, this invention relates to improvement in a film control system, in which when detecting means produces signals in respondence with the density change of the film and the signals thus produced are recognized as the true picture frame edge signals, signals for stopping transfer of the film are generated, thereby effecting the printing of the picture frame located exactly at the exposure station.

The picture frames successively photographed on the film, especially on the non-perforation roll film, are substantially constant in length, but a spacing between two contiguous picture frame is irregular. Furthermore, the length of a frame is not always equal but different due to different types of cameras, even though the identical nominal size of camera is used.

This often causes that, in printing of the film of the type, if the first picture frame is exactly positioned at the exposure station and said picture frame is transferred by a given distance, the succeeding picture frame does not necessarily take the exact position at the exposure station.

In view of the above-described drawback of the conventional system and taking in view the fact that the film dnesity is greatly different between two contiguous picture frames, the applicant invented a film control system and as noted above filed it for patent on June 9, 1970 (Ser. No. 44,730). In that system, there is provided means for detecting the density change of the film being in transfer, the means detecting the point where the density greatly changes and identifying the point as the picture frame edge, so that just when the picture frame is correctly positioned at the exposure station according to the detected signals, the film is stopped, thus keeping the picture frame in position, signals of the detecting means are recorded on the recording tape travelling in synchronism with the transfer of the film; a first discriminator is provided for detecting whether or not the recorded signals are true picture frame edge signals, and according to the outputs of the discriminator, the film is stopped.

However, an unexpected density change is often experienced because of the picture frame bearing an image of a photographed object thereon and because of the possible existence of scars on the film, in the spacing between contiguous picture frames which is normally transparent. In such cases, the first discriminator fails to distinguish a true edge signals from signals from the detecting means sensitive to the density change described, resulting in the operational error in the film control system.

OBJECTS OF THE INVENTION

In this invention, such provisions are made that a black frame enclosing a picture frame is formed on each picture frame; the signals of the detecting means sensitive to the density change between the black frame and the transparent spacing existing between the contiguous picture frames are transmitted through a gate circuit to a second discriminating means; and when the second discriminating means does not recognize the signals of detecting means as a true picture frame edge signal, the transfer of the film is urgently stopped, thereby ensuring the discrimination of the true picture frame edge signal from detected signals, hence the above-described drawback is eliminated.

Accordingly, an object of this invention is to provide a film control system in which when a first discriminating means recognizes both or either of a fore and aft edge signals of picture frame as true picture frame edge signals, and the picture frame is positioned exactly at the exposure station, transfer of the film is stopped, while in case a second discriminating means, to which the detected signals are fed as inputs, detects no edge signal, the film is brought to an emergency stop.

Another object of this invention is to provide a film control system, wherein if the second discriminating means, to which signals of the detecting means are fed as inputs through a gate, recognizes the input signals as neither fore edge signal nor aft edge signal, or detects said input signals as non-signal, the film is released from the emergency stop and transfer of the film is continued until either of the fore and aft edges of the picture frame is detected as picture frame edge signals.

A further object of this invention is to provide a film control system, in which the signals from the means for detecting the density change on the film being transferred are fed as inputs to the second discriminating means through a gate adapted to be opened for an expected period of generation of fore edge signals of a picture frame which is obtained from the tolerance of a spacing between film frames, and the signals from the detecting means are fed as inputs to the second discriminating means through a gate adapted to be opened for an expected period of generation of aft edge signals of a picture frame which is obtained from the tolerance between lengths of film frame; when the first discriminator detects both or either of the fore and aft edge signals from the input signals, the transfer of the film is controlled so as to stop the picture frame exactly at the exposure station; when the second discriminating means distinguishes neither of the fore and aft edge signals, the film is brought to an emergency stop; and in case both of the edge signals are recognized as nonsignal, the film is released from the emergency stop.

These and other objects of this invention will be apparent from the description with respect to the embodiments.

SUMMARY OF THE INVENTION

In a film control system in which, while a film with a number of picture frames disposed in alignment thereon is being transferred in the direction of picture frame disposition, the detecting means detects the density change on the film to generate signals. The detected signals are recorded on a recording tape. When the picture frame is positioned exactly at the exposure station according to the recorded signals, the output of the first discriminating means controls transfer of the film. The signals from the detecting means are recorded through a first gate on another recording member driven in association with the transfer of the film. A second gate is opened by the recorded signals for an expected duration of generation of the aft edge signals of the picture frame which is obtained from the average length of the picture frame and the tolerance thereof. A first gate is opened by the recorded signals for an expected duration of generation of the fore edge signals of a succeeding picture frame which is obtained from an average spacing between contiguous picture frames and the tolerance thereof. The signals from the detecting means are fed as inputs through the first and second gates to a second discriminating means. When the second discriminating means detects at least either of the fore edge signals and aft edge signals of the picture frames, from the input signals fed thereto, the second discriminating means, without generating an operation signal, controls the transfer of the film according to the signals detected as edge signals, so as to stop the picture frame exactly at the exposure station. When the second discriminating means detects neither of the fore and aft edge signals, the second discriminating means generates signals for an emergency stop of the film, thereby bringing the film to an emergency stop.

In addition, in the film control system of this invention, when the second discriminating means detects both of the fore and aft edge signals as non-signals, the transmission of the signals an emergency stop is blocked.

A feature of this invention exists in that by the provision of a first gate adapted to be opened only when a fore edge of a succeeding picture frame contiguous to the preceding picture frame is expected to pass the detecting means, signals of the detecting means, if the signals represent the density change on a portion of a film other than the portion where the fore edge is supposed to exist, are prevented from being transmitted to the second discriminating means and the recording member. The film control system is thus free from the operation error resulting from the signals. Furthermore, the detecting signals of the detecting means sensitive to the density change on a portion of film other than the portion where the aft edge is supposed to exist are prevented from being transmitted to the second discriminating means and the recording member, by the existence of a second gate adapted to be opened only when the aft edge of the picture frame is supposed to pass the detecting means. Consequently, the operational error in the film control system, which is caused from the signals, is eliminated.

A second feature of this invention exists in that when both of the fore and aft edge signals of picture frame which are fed as inputs to the second discriminating means are plural signals or non-signals rather than a single signal, the second discriminating means detects that the signals fed as inputs are not a true picture frame edge signal, and generates output signals for bringing the film to an emergency stop, thereby eliminating an improper printing.

A third feature of this invention is in that when the second discriminating means recognizes, as non-signals both of the fore and aft edge signals of the picture frame which are fed as inputs thereto, and a single picture frame to be disposed on the film is left unexposed and the film is transferred in unloaded state, the generation of signals for emergency stop of the film is prevented, hence transfer of the film having an unphotographed portion corresponding to the picture frame to be disposed thereon is continued.

DETAILED DESCRIPTION OF THE INVENTION

Figure 1:
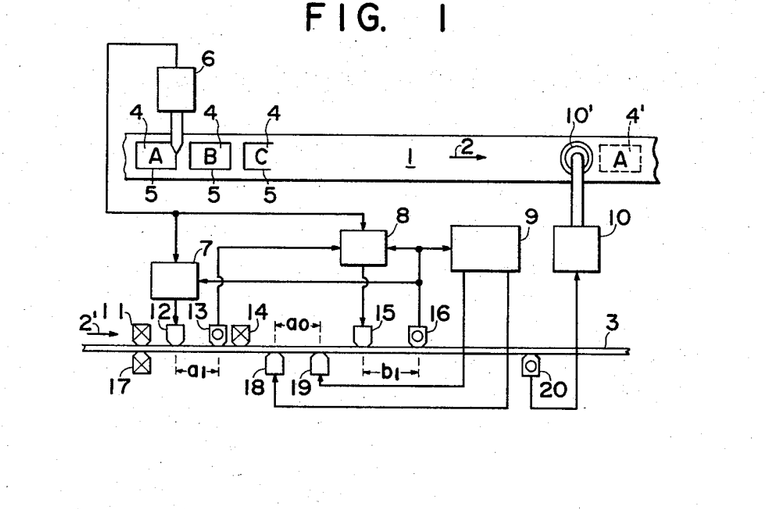
FIG. 1 is a block diagram of a first embodiment of a device for stopping at an exposure station a picture frame which is transferred by picture frame edge signals, in a film control system according to this invention.

Referring to FIG. 1 to describe the first embodiment of the present invention, a film 1 having a plurality of picture images disposed successively thereon in a series of picture frames is transferred in the direction of arrow 2 by any transfer device (not shown). The picture image of this film is generally formed by photographing an object (a document, for example) placed on a white board having black borders, in which said picture image is enclosed to form its picture frame, of predetermined density, and the density between picture frames is comparatively low.

A magnetic tape 3 is also transferred in the direction of arrow 2', in synchronization with the film 1.

Figure 2:
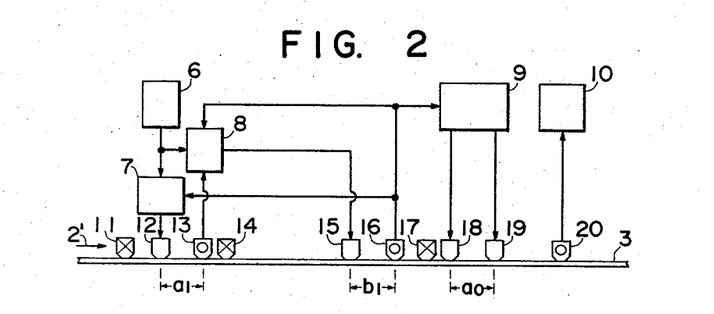
FIG. 2 is a block diagram of a second embodiment of the same.

The magnetic tape 3 has a number of heads 11 through 20 mounted in operative relationship therewith wherein the heads 12, 15, 18 and 19 having no mark therein are the recording heads, the heads 13, 16, 20 marked with 0 are the record reading heads, and the heads 11, 14, and 17 marked with X are the erasing heads. Although a group of heads 11 through 16 and another group of heads 18 through 20 are disposed respectively on the front and the rear surfaces of the tape 3 in the drawing, all heads of both groups can be juxtaposed on the identical face of the tape 3, as shown in FIG. 2 for a more convenient arrangement.

The film 1 includes a picture frame edge detecting device 6 and a film stop device 10' spaced apart from each other, wherein picture frame edge detecting device 6 detects each picture frame edge which is a boundary between a space between each picture frame and a picture image on the transported film 1, by means of, e.g., an illuminating light source and a photoelectric conversion element.

The film stop device 10' comprising an electromagnet positioned on one side of the film 1 and a steel pice facing thereto and closely located on the other side of the film 1, stops the film 1, when the electromagnet is excited, by gripping it between the electromagnet and the steel piece.

Assuming now that the front edge of one picture frame A is detected by the picture frame edge detecting device 6, its detected signal is transmitted to the recording heads 12 and 15 via the gates 7 and 8 respectively, and recorded on the tape 3 at two positions thereon, when the gates 7, 8 have been opened, the signal recorded by the head 12 being inspected by the reading head 13 thereafter.

The distance between heads 12 and 13 is substantially equal to the minimum value $a_1$ of the standard size of one picture frame. The signal inspected by the head 13 reopens the gate 8 which has been temporarily closed by the passage of the detecting aforementioned signal and is erased by an erasing head 14. The reason why, in addition to a recording head 15, a recording head 12 is provided, in the emobidment of the present invention, is as follows. In order to record by means of said head 15 the aft signal of the first picture frame, it is necessary to leave gate 8 opened when it passes through the picture frame edge signal from detecting device 6. Accordingly head 13 must read the fore edge signal recorded by head 12 and gate 8 is opened. With regard to the second edge and other edges coming after said edge in order, therefore, heads 12, 13 and 14 become actually unnecessary, since gate 8 is opened by means of the reading signal of a reading head 16 as described hereinafter. Immediately after gate 8 is reopened, the aft edge of a picture frame A passes the picture frame edge detecting device 6, thereby its signal transmitted to a recording head 15 through the gate 8 is recorded on the tape 3.

Consequently two signals for the fore edge and the aft edge of the picture frame A are recorded onto the tape 3 from head 15, spaced apart the length of the picture frame A.

A reading head 16 is provided at a distance which is equal to the minimum picture frame distance $b_1$, that is, the distance from the fore edge of picture frame B to the fore edge of picture frame A, for example, or a little shorter distance, in the direction of the arrow 2' from head 15.

Head 16 is the first to inspect the fore edge record of the picture frame A, then inspects the aft edge record of the picture frame A, transmitting the respective inspected signals to a discriminator 9 and the gate 8. When the signal for the fore edge of the picture frame is checked by the discriminator to correspond to the signal of the correct fore edge, that signal is transmitted to the head 18 and recorded in another line on the recording tape 3, and the discriminator 9 closes a gate through which the aft signal as described hereafter by head 16 is sent to recording head 19. But if the signal corresponding to the fore edge of the picture frame is determined to be unusual, that signal is stopped by the discriminator 9, after being held until the signal for the aft edge of the picture frame A is inspected by the head 16, it is recorded in another line on the recording tape 3 through the opened gate in the discriminator 9.

Further, the distance between the recording heads 18 and 19 is so arranged as to conincide with the average value $a_0$ of one picture frame length, thereby the signal recorded by the head 19 is recorded at a position which conincides with the position to which the signal for the fore edge of the picture frame should be recorded by the head 18, substituting the signal of the fore edge of the picture frame A which was not recorded thereon due to its being faulty.

The signal thus recorded is inspected by a reading head 20. The position where said reading head 20 is disposed, when the signal recorded by head 18 or head 19 reaches the head 20, is set so that the picture frame corresponding to said signal reaches the position to be exposed. That is, the distance from head 19 to head 20 corresponds to the distance from the detection point of detector 6 to the position of the aft edge of the picture frame in the position to be exposed, and if film 1 is equal in travel speed to tape 3, they become equal in distance. The film stop device 10 is activated the inspection signal from head 20, concurrently, the picture frame A is printed at this time when it has been transferred to a position, as shown by broken lines 4', where it is properly position relative to the exposure device (not shown).

In addition, gate 8 is so controlled that it is open when the signals inspected by the head 16 enter the gate 8 as described above.

The standard for discriminating signals detected by the picture frame edge detecting device varies, but usually picture frames formed on a transparent film substance are surrounded by a black framing in which a picture image is photographed, therefore, a detecting signal of picture frame edges ought to be of a stepped type with one high-to-low or low-to-high level transitions. Therefore, when a signal includes a number of steps or alternatively when there is no signal, precautions must be taken against such situation due to the possibility of a false determination.

Accordingly, the discriminator 9 temporarily stops such a fore edge detecting signal entered therein and checks the aft edge detecting signal to be substituted therewith, then if it is found to be of a proper stepped type, the recording head 19 records it in the position corresponding to the fore edge detecting signal, as a substitute of the fore edge detecting signal. But if the aft edge detecting signal is absent or has a number of steps, its recording is prevented, thereby providing a determination that the picture frame edge detecting signal is completely faulty.

The second embodiment of the present invention as shown in FIG. 2 provides for recording on one line only of a recording tape, wherein recording heads 18 and 19 are disposed on the same line with a reading head 16 in the direction of arrow 2' therefrom, and an erasing head 17 is disposed between the head 16 and the head 18. The distance between the heads 18 and 19 is set to the average value of the picture frame length just as in the first embodiment, thereby they function in the same way as the first embodiment.

Figure 3:
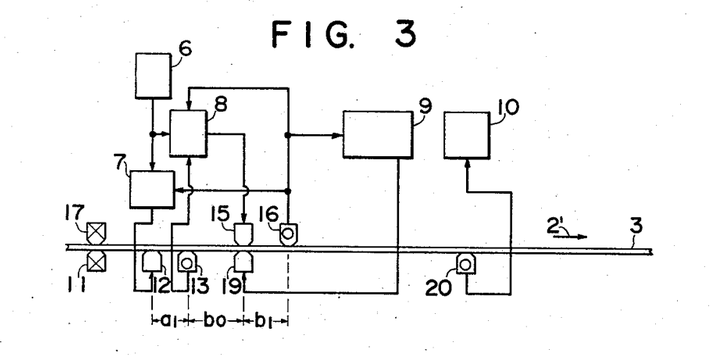
FIG. 3 is a block diagram of a third embodiment of the same.

The third embodiment of the present invention is shown in FIG. 3, wherein recording head 18 of the first embodiment has been omitted, but the relationship between the recording head 12 and reading head 13, and their locations relative to the picture frame edge detecting device 6 and the gates 7, 8 are the same as in the first embodiment. Signals of the fore and aft edges transmitted from the picture frame edge detecting device 6 via the gate 8 are recorded by the recording head 15, independently with the recording by head 12, thereby its the distance from reading head 13 to the recording head 15 is equal to the average value $b_0$ of the spacing between picture frames, and the distance of the reading head 16 from the head 15 is equal to the minimum value $b_1$ of the spacing of picture frames.

While the record reading signal by the head 16 opens the gates 7, 8, it is also simultaneously identified by the discriminator 9.

Now if the discriminator 9 passes the fore edge signal of the recording head 15, the fore edge signal recorded by the head 12 is also passed, thereby it is permitted to pass through to the reading head 20, and actuates the film stop device 10. Alternatively, if the discriminator 9 does not pass the fore edge signal from the head 16, the recorded aft edge signal is transmitted by the discriminator 9 to the head 19 which is in the same position as the other side of the tape 3 as the head 15. Concurrently, the fore edge signal which cannot be discriminated from the correct signal recorded by recording head 12 reaches the position of recording head 19 where the correct signal of the aft edge is recorded by said head 19, which is detected by reading head 20 whose output causes film stopping device 10 to be operated.

Figure 4:
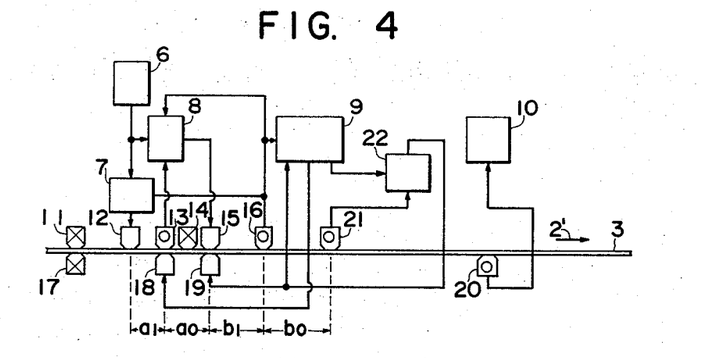
FIG. 4 is a block diagram of a fourth embodiment of the same.

In the aforementioned embodiments, the questionable fore edge signal of a picture frame is substituted by the aft edge signal of the same picture frame, but in the fourth embodiment of this invention as shown in FIG. 4, its recording is substituted by the picture frame edge signal for the next succesive picture frame.

This embodiment is also the same as the first embodiment as to the relationship between the recording head 12, the reading head 13, the picture frame edge detecting device 6 and the gates 7, 8.

A head 15 which records on the tape 3 signals of the fore edge and the aft edge transmitted from the picture frame edge detecting device 6 through the gate 8 is disposed apart from the head 13 by a distance of the average value $a_0$ of a picture frame length in the direction of arrow 2', and its distance from the reading head 16 is equal to the minimum distance between picture frames just as in the first embodiment.

Another reading head 21 is additionally disposed apart from head 16 in the direction of arrow 2' by the average distance $b_0$ between picture frames, its sensed signal is transmitted to the head 19 via a gate 22, the output of the discriminator 9 is transmitted to the head 18 located in the same position as the head 13, but in another line on the tape 3 concurrently controlling the opening and closing operation of gate 22.

Now when the fore edge signal by the head 16 is passed by the discriminator 9, it is recorded by the head 18, and the discriminator 9, although it accepts the aft edge signal as correct, stops sending it to head 19, whereas if it is not reliable, that signal is stopped by the discriminator 9. Further, when the aft edge signal from head 16 is passed by the discriminator 9, its output is recorded by the head 19, taking the aft edge signal as the substitute of the fore edge signal. However, if the aft edge signal is also not passed by the discriminator 9, the output of the discriminator 9 opens gate 22 and the aft edge signal of the preceding picture frame is inspected by a head 21 and transmitted to the head 19 via the opened gate 22, head 19 recording it as the substitute thereof.

In a system for controlling transfer of a film by edge signals of a picture frame disposed on a film as shown in FIGS. 1 through 4, the film control system of this invention comprises a device to be added to the film transfer control system and controls the transfer of the film in the case where the picture frame edge signals detected by the detecting means 6 are abnormal signals.

Figure 5:
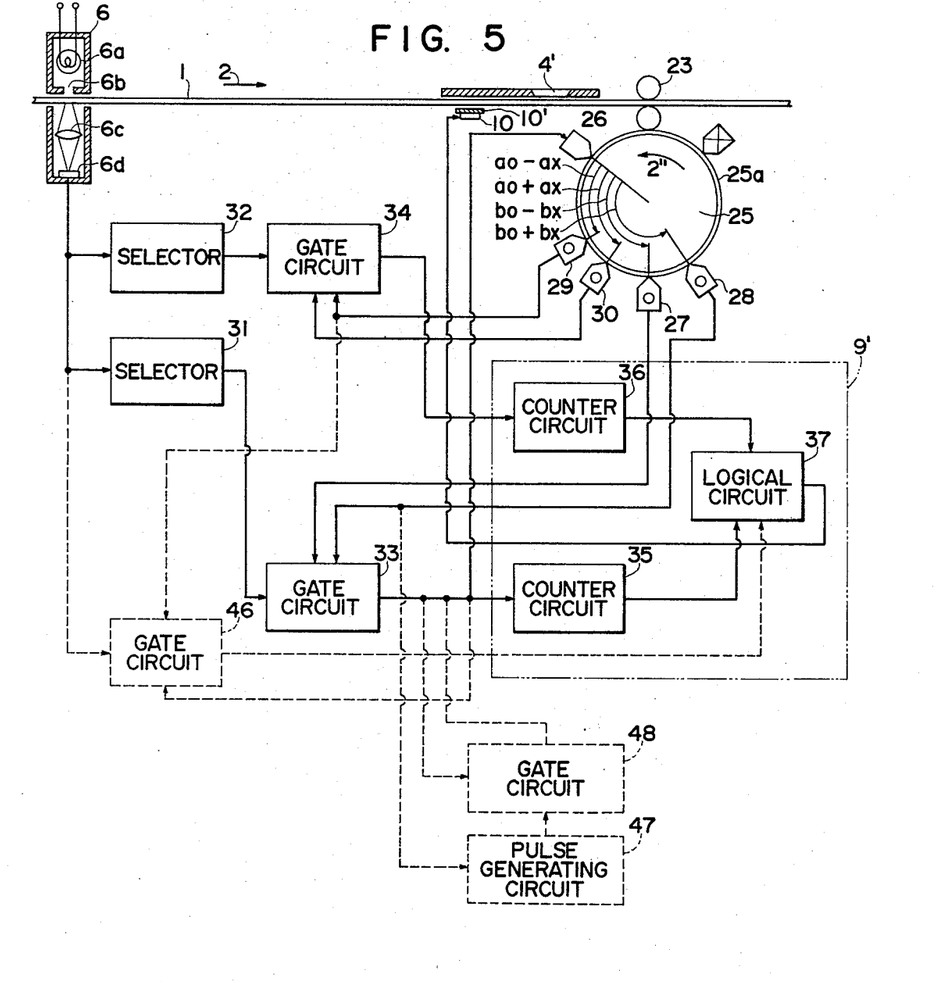
FIG. 5 is a block diagram of an essential part of a device for controlling a film in case abnormal signals are generated as picture frame edge signals, in respective embodiments shown in FIGS. 1 through 4.
Figure 7:
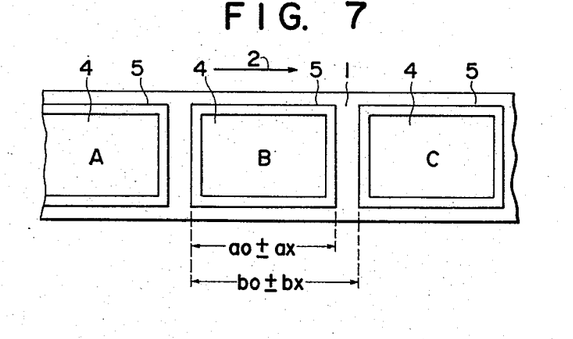
FIG. 7 is an enlarged view of a photographic film on which picture frames are formed.

Referring to FIG. 5, a number of picture frames are successively disposed in alignment on a film 1, as shown in FIG. 7. The formation of a picture frame is such that an object to be photographed, such as a literature, is placed on a white base paper, and respective picture frames are photographed, whereupon a portion of base paper is formed around a picture image 4 as a black frame 5 of a given density. In this case, the spacing between the black frames of contiguous picture frames is unexposed, hence of low density nearly to transparency, as set forth in the foregoing. Also as described in the foregoing, the picture image 4 corresponding to the object to be photographed is formed within the black frame 5, depending upon the density such as a high density portion or a low density portion.

Figure 8:
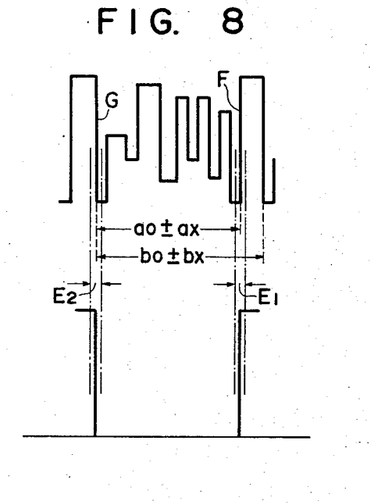
FIG. 8 is a plot of outputs of a detecting means which are detected at a spacing between two contiguous picture frames, and of a duration a first and second gates are opened, in the embodiments given in FIG. 5.

The intensity of light rays transparent through the film 1 is as shown in FIG. 8 as an example. A picture frame length including the black frame 5 is substantially constant as long as the identical camera is used in the photographing process, but some changes do occur if a different type of camera is used. Assuming the average length of picture frame being $a_0$ and the tolerance being $a_x$, then $a$ is within the range of $a_0 \pm a_x$.

Furthermore, in two pictures arranged in a mutually contiguous relation, the spacing between contiguous picture frames, more specifically, a distance $b$ from a fore edge of a preceding picture frame up to a fore edge of a succeeding picture frame (this distance will be hereinafter referred to as the spacing of the picture frame,) is not always constant, even in the identical film photographed by the identical camera, and assuming the average spacing of $b_0$ and the tolerance of $b_x$, then $b = b_0 \pm b_x$. The tolerances $a_x$ and $b_x$ can be experimentally obtained.

The film 1 is transferred, by means of driving rollers 23 and 24 which are in pressure-contacting relation with each other through the film 1, in the direction of arrow 2, in which the picture frames are disposed in alignment. There are provided a detecting means 6, a stopper 10 and an exposure station 4', all of which face the film path for transferring the film 1, as set forth.

The detecting means used in FIG. 5 is idential with the picture frame edge detecting means used in the embodiments 1 through 4, and the detecting means may be separately provided. The detecting means 6 includes a slit, $6_b$ undergoing irradiation of a light source $6_a$ and contacting the film 1 to be transferred, and light rays which have passed through the film 1 are received on a photoelectric element $6_d$ by a lens $6_c$. Accordingly, current corresponding to the density of the film 1 flows to the photoelectric element $6_d$, and the change of density on the film 1 is detected as signal current. The current thus produced has the characteristic as shown in FIG. 8, and the current is fed to the gates 7 and 8 in the embodiment of FIG. 1, while at the same time it is fed to selectors 31 and 32 and a gate 46 shown in FIG. 5 which will be described later.

A recording roller 25 frictionally abutting against one roller 24 of the driving rollers 23, 24 has a recording member 25a wound therearound, which is separate from a recording tape 3. The recording member 25a is a magnetic tape on which it is easy to record and erase. The recording roller 25 rotates in the direction of arrow 2'' at a speed equal to the transfer speed of film in the direction of arrow 2.

A recording head 26 is disposed adjacently to the circumference of the recording roller 25. In the rotational direction 2'' of the recording roller 25 and on the side of the recording head 26, there are provided four reading heads in such way that a first recording head 29 is positioned at a minimum frame length $(a_o - a_x)$, which is obtained from the lengths $a_o$, $a_x$, $b_o$, $b_x$, a second reading head 30 is at a maximum frame length $(a + a_x)$, a third reading head 27 is at a minimum frame spacing $(b_o - b_x)$ and a fourth reading head is at a maximum frame spacing $(b_o - b_x)$, respectively.

The third and fourth reading heads 27 and 28 are connected to a first gate 33, this gate being adapted to be opened by detecting signals from the third reading head 27 and to be closed by detecting signals from the fourth reading head 28.

Outputs of the first and second reading heads 29 and 30 are fed to a second gate 34, the second gate being adapted to be opened by detecting signals from the first reading head 29 and to be closed by detecting signals from the second reading head 30. This means that the first gate 33 is in the opened state for a duration $2bx$ shown by E2 in FIG. 8, and the second gate 34 is in the opened state for a duration $2ax$ shown by E1 in FIG. 8.

With respect to the output signals of the detecting means 6, the first selector 31, as described, passes only the signals that vary from the high level to the low level, out of the output signals of detecting means, for feeding these signals to the first gate 33, while the selector 32 passes only those signals of the detecting signals that vary from the low level to the high level for feeding the selected signals to the second gate 34. Hence, the signals shown by F in FIG. 8 are fed from the first gate 33 to a signal number discriminator 35, and the signals shown by G in FIG. 8 are fed from the second gate 34 to a signal number discriminator 36.

Both signal number discriminators 35 and 36 respectively detect whether the signal F or G is non-signal, or a single signal or plural signals, and then feed the detected signals to a logic circuit 37, in which circuit 37 the result of discrimination is stored for collating. In short, the second discriminator 9' consists of two signal number discriminators 35 and 36 and the logic circuit 37.

In collating the discriminated signals in the logical circuit 37, if both of the signals from the first gate 33 and from the second gate 34 are a single signal, the signal can be recognized to be true edge signals of the picture frame, and even if one of them is a non-signal or plural signals, as long as the other signal is a true single signal, the picture frame is recognized to be exactly disposed on the film.

The following cases tell that the picture frame is disposed on the film, and the edge signals thereof are detected.

1. The signal from the first gate 33 is in a single signal and the signal from the second gate 34 is a single signal.

2. The signal from the first gate 33 is a single signal and the signal from the second gate 34 is non-signal.

3. The signal from the first gate 33 is a single signal and the signals from the second gate 34 are plural signals.

4. The signal from the first gate 33 is a non-signal and the signal from the second gate 34 is a single signal.

5. The signals from the first gate 33 are of plural signals and the signal from the second gate 34 is a single signal.

Should other mode of signals, different from the above-described cases, come from the first and second gates 33 and 34, and be transmitted to the logical circuit 37, then it is abnormal, and this means that a picture frame corresponding to the fore or aft edge signal is not disposed on the film.

Figure 6:
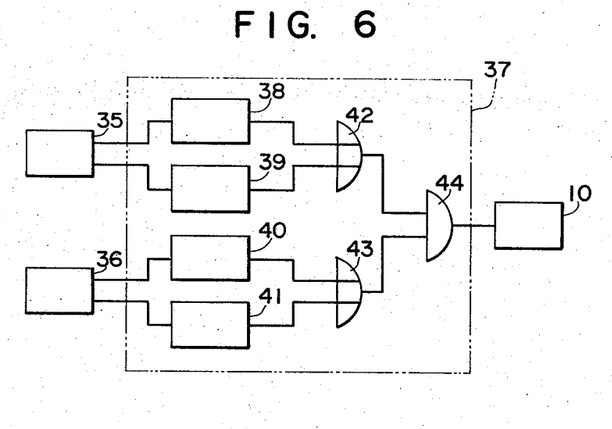
FIG. 6 is a detailed block diagram of a second discriminator of the embodiments described.

In FIG. 6, there is shown a block diagram of the logic circuit 37 in detail, wherein the signal number discriminator 35 is connected to a non-signal detecting circuit 38 and a multi-signal detecting circuit 39. The output signals of the signal number discriminator 35 are fed as inputs to each detecting circuit 38 or 39, and the detecting signals therein are further fed through an or-circuit 42 to an and-circuit 44. The output signals of the signal number discriminator 36 are fed as inputs to a non-signal detecting circuit 40 and a multi-signal detecting circuit 41, and the outputs from both detecting circuits 40 and 41 are transmitted through another or-circuit 43 to the and-circuit 44. Accordingly, in the above-described cases 1 through 5 wherein the picture frame is correctly disposed on the film and the signals are recognized as edge signals of the picture frame, no output signal is generated from the and circuit 44, and when the picture frame is disposed exactly at the exposure station by the first discriminating means 9, the transfer of the film is stopped for printing, as shown in the embodiments of FIGS. 1 through 4.

On the contrary, if no signal is recognized as an edge signal of the picture frame to be disposed on the film, output signals are generated from the "and" circuit 44 to actuate the stopper 10, thereby rendering the film to an emergency stop.

As additionally shown in FIG. 5 in the block portion enclosed by the dotted line, if both of the output signals which are fed as inputs from the signal number discriminators 35 and 36 to the logical circuit 37 are detected as non-signal by the non-signal detecting circuits 38 and 40, it tells that a single frame or more of the film bears no picture image, and the film is transferred in an unloaded state. In this case, by the existence of the circuit shown by the dotted line in FIG. 5, the film goes on running and is not brought to an emergency stop.

Referring to a gate 46, the signals of the detecting means 6 are fed as inputs to the gate 46, and both of the F signals selected by the selector 31 and passing through the first gate 33 and the reading signals of the first reading head 29 are also fed thereto. The gate 46 is adapted to be opened by the F signals and closed by the reading signals. When the gate 46 is in the opened state, the detecting signals are fed to the logic circuit 37 so as to prevent transmission of the signals for an emergency stop to the stopper 10.

Shown at block 47 is an electric circuit which generates signals after the reading signals of the fourth reading head 28 are fed as inputs and after the lapse of a time required for transferring the film by a distance greater than the spacing $(b_o + b_x) - (a_o - a_x)$ since the reading signals have been fed, and which feeds false signals, in place of the F signals, to the reading head 26 and the gate 46 through a gate 48, when the gate 48 is in the opened state.

Gate 48 is adapted to be closed only when the F signals are fed as inputs thereto and maintained open when an F signal is not fed.

With such arrangements, the electric circuit shown within the dotted lines operates as follows.

Figure 9:
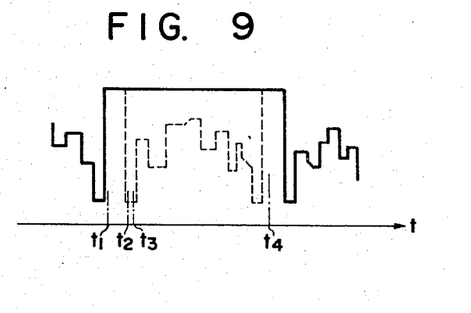
FIG. 9 is a plot of outputs of detecting means which are detected where a certain picture frame is transferred in unexposed state.

In the case where one or more film frames bear no picture frame and the film is transferred in the unphotographed state, the detecting signals from the detecting means 6 present the flexible line as shown with the solid line in FIG. 9, wherein:

1. At time $t_1$, the reading signals of the fourth reading head 28 enter the circuit 47.

2. At time $t_2$, the gate 48 is in the opened state because the F signals are fed as inputs.

3. At time $t_3$, the false signals of the circuit 47 are fed through the gate 48 to the recording head 26 and the gate 46, whereby the gate 46 becomes opened. 4. Thereafter, the signals recorded on the recording member 25' by the recording head 26 according to the false signals are read by the first reading head 29, and unless changing signals are fed to the gate 46 by the time the gate 46 is closed by the reading signals, in other words, for a duration from the time $t_3$ to the time $t_4$, the signals for emergency stop which are to be generated from the logical circuit 37 are blocked.

Accordingly, this added circuit is so constructed that the signals for emergency stop of film are generated after the generation of block signals.

The added circuit serves to control the film transfer system in such a way that where both of fore and aft edge signals are abnormal, with the exception that both edge signals are non-signal, the control signals for bringing the film to emergency stop are generated by the logic circuit, and in the case where both edge signals are non-signals, the transfer of the unloaded film is continued.

What is claimed is:

1. A system for controlling a mechanism for transporting a film along a first path, said film having a number of picture frames surrounded by black frames and successively disposed on said film in the direction of said first path, where each frame has a length of $a_o \pm a_x$, where $a_o$ is the mean value and $a_x$ is the tolerance and between neighboring picture frames there is an interval of $b_o \pm b_x$, where $b_o$ is the mean value and $b_x$ is the tolerance, said system including detecting means positioned along said first path for generating output signals in response to the density of said film, a first recording medium driven along a second path in synchronism with said transporting mechanism, first recording means for recording signals which include signals indicative of fore and aft edges of the picture frames on said first recording medium in response to the output signals from said detecting means, first means for discriminating said recorded signals on said first recording medium to determine true fore and aft edge signals of one of said picture frames, an exposure station positioned along said first path, means for stopping actuated by an output from said first means for discriminating to stop the transportation of said film for positioning said picture frame having at least one of said detected fore and aft edge signals at said exposure station, said system comprising:

a second recording medium driven along a third path in synchronization with said transporting mechanism;

second recording means having its input coupled to the output of said detecting means and disposed on said third path for recording signals on said second recording medium;

second means for discriminating whether a respective signal of two kinds of output signals from said detecting means is a true fore or aft signal;

first means coupled between said detecting means and said second recording means for supplying first of said two kinds of output signals which change from a higher level of an output signal of said detecting means to a lower level only when it is determined that the fore edge of one of the picture frames passes through said detecting means, to said second recording means and said second means for discriminating through the use of signals recorded on said second recording medium and on the basis of a mean value ($b_o$) of intervals between neighborning picture frames with each other disposed on the film and the tolerance ($b_x$) thereof;

second means supplying second of said two kinds of output signals which change from a lower level of an output signal of said detecting means to a higher level only when it is determined that the aft edge of one of the picture frames passes through said detecting means, to said second means for discriminating through the use of signals recorded on said recording medium and on the basis of a mean value ($a_o$) of length picture frames disposed on the film and the tolerance ($a_x$) thereof; and said second means for discriminating generating an output for abruptly stopping said film transportation by rapidly actuating said means for stopping when neither of said two kinds of output signals is discriminated to be a true fore or aft signal.

2. A system as in claim 1, further comprising:

first sensing means disposed on said third path in the direction in which said second recording medium is driven and in a position spaced from said recording means by a distance at least equal to the length of the tolerance ($a_x$) of the length of respective picture frames subtracted from the mean value ($a_o$) of the length of respective picture frames;

second sensing means disposed on said third path in said direction, spaced from said first sensing means by a distance at least twice the length of the tolerance ($a_x$) of the length of said picture frames;

third sensing means disposed on said third path in said direction, spaced from said second recording means by a distance at least equal to the length of tolerance ($b_x$) of intervals between neighboring picture frames with each other subtracted from the mean value ($b_o$) of intervals therebetween;

fourth sensing means disposed on said third path in said direction, spaced from said third sensing means by a distance at least twice the length of the tolerance ($b_x$) of said intervals;

a first gating means opened by a reading signal of said third sensing means and closed by a reading signal of said fourth sensing means, for transmitting signals past through said first means to said second recording means and said second means for discriminating; and second gating means opened by a reading signal of said first sensing means and closed by a reading signal of said second sensing means, for transmitting signals past through said second means to said second means for discriminating.

3. A system as in claim 2, wherein there is provided means for determining that the signals supplied to said second means for discriminating from both said first gating means and said second gating means are both a non-signal, which is indicative of an unexposed frame, said determining means preventing the generation of signals for operating said means for stopping said second means for discriminating when said both signals are non-signals.

4. A system as in claim 2, further comprising:

signal generating means into which a reading signal of said fourth sensing means is supplied and generates signals after the time required for the film to be transferred by a distance slightly longer than the length of the minimum interval ($b_o - b_x$) between neighboring picture frames with each other subtracted from the maximum distance thereof ($a_o - a_x$) which has lapsed from the moment when said reading signal of said fourth sensing means was supplied;

third gating means closed only when signals passing through said second gating means are received and for transmitting signals generated by said signal generating means to said second means for discriminating when opened;

fourth gating means opened by signals passing through said first gating means and said third gating means and closed by a reading signal of said first sensing means, and for transmitting signals of said detecting means to said second means for discriminating; and means for preventing the generation of signals for operating said means for stopping in said second means for discriminating by the use of signals passing through said fourth gating means.

* * * * *